United States Patent
Zander et al.

(10) Patent No.: US 9,458,286 B2
(45) Date of Patent: Oct. 4, 2016

(54) CATALYST FOR EPOXIDE POLYMERISATION AND FOR THE COPOLYMERISATION OF EPOXIDE WITH CARBON DIOXIDE

(71) Applicant: HENKEL AG & CO. KGAA, Duesseldorf (DE)

(72) Inventors: Lars Zander, Rommerskirchen (DE); Christiane Kunze, Cologne (DE); Johann Klein, Duesseldorf (DE); Eckhard Paetzold, Broderstorf (DE); Marion Marquardt, Rostock (DE); Udo Kragl, Kritzmow (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/041,075

(22) Filed: Sep. 30, 2013

(65) Prior Publication Data

US 2014/0031519 A1   Jan. 30, 2014

Related U.S. Application Data

(63) Continuation of application No. PCT/EP2012/056077, filed on Apr. 3, 2012.

(30) Foreign Application Priority Data

Apr. 4, 2011 (DE) .................. 10 2011 006 730

(51) Int. Cl.
| | |
|---|---|
| *C08G 59/68* | (2006.01) |
| *C08G 65/04* | (2006.01) |
| *B01J 31/02* | (2006.01) |
| *C08G 64/34* | (2006.01) |

(52) U.S. Cl.
CPC .......... *C08G 59/686* (2013.01); *B01J 31/0202* (2013.01); *C08G 64/34* (2013.01); *B01J 2231/14* (2013.01)

(58) Field of Classification Search
CPC .................................. C08G 59/686
USPC ........................................ 525/523
See application file for complete search history.

(56) References Cited

U.S. PATENT DOCUMENTS

| | | | |
|---|---|---|---|
| 4,826,887 A | 5/1989 | Kuyper et al. | |
| 4,826,952 A | 5/1989 | Kuyper et al. | |
| 5,536,883 A | 7/1996 | Le-Khac | |
| 5,998,327 A | 12/1999 | Hofmann et al. | |
| 6,313,060 B1 | 11/2001 | Sugiyama et al. | |
| 6,429,342 B1* | 8/2002 | Clement et al. | 568/616 |
| 6,852,664 B2 | 2/2005 | Ooms et al. | |
| 7,754,643 B2 | 7/2010 | Srinivas et al. | |
| 7,842,653 B2 | 11/2010 | Darbha et al. | |
| 8,324,419 B2 | 12/2012 | Mijolovic et al. | |
| 2005/0192467 A1 | 9/2005 | Mellado et al. | |
| 2007/0135298 A1 | 6/2007 | Mellado et al. | |
| 2007/0191216 A1 | 8/2007 | Dhingra et al. | |
| 2010/0041864 A1* | 2/2010 | Kadowaki et al. | 528/409 |

FOREIGN PATENT DOCUMENTS

| | | |
|---|---|---|
| CN | 1459332 A | 12/2003 |
| JP | 2003165836 A | 6/2003 |
| JP | 2004160446 A | 6/2004 |
| JP | 2005240002 A | 9/2005 |
| JP | 2010516796 A | 5/2010 |
| WO | 9911649 A1 | 3/1999 |
| WO | 0002951 A1 | 1/2000 |
| WO | 2004087788 A1 | 10/2004 |

OTHER PUBLICATIONS

STN International, Chemical Abstracts Registry for Registry Nos. 112-92-5, 593-32-8, and 111897-18-8, 2014.*
International Search Report for PCT/EP2012/056077, 4 pages, Oct. 11, 2012.

* cited by examiner

Primary Examiner — David Karst
(74) Attorney, Agent, or Firm — James E. Piotrowski

(57) ABSTRACT

The invention relates to a catalyst for catalysing the polymerisation of epoxides, and which is to be improved such that it allows a more efficient reaction to be carried out. This is achieved by providing a catalyst obtainable by mixing a) at least one double metal cyanide compound, b) at least one organic complexing agent, and c) at least one primary alcohol with 6 to 24 C atoms. In addition, the invention relates to a method for the polymerisation of epoxides, and to the use of the claimed catalyst for the polymerisation of epoxides and the copolymerisation of epoxides with carbon dioxide.

7 Claims, No Drawings

CATALYST FOR EPOXIDE POLYMERISATION AND FOR THE COPOLYMERISATION OF EPOXIDE WITH CARBON DIOXIDE

BACKGROUND OF THE INVENTION

The present invention is in the field of catalysts, as used for example in methods for the production of polymers. The invention relates in particular to catalysts based on double metal cyanide compounds and proposes a novel catalyst of this type.

Double metal cyanide complex compounds (DMC complex compounds) are known in principle as catalysts, e.g. for the polymerization of epoxides. For example, polyethers that are distinguished by a particularly narrow molecular weight distribution, a high average molar mass and a very low number of double bonds at the ends of the polymer chains can be produced using catalysts of this type. However, DMC catalysts can also be used to produce other polymers, e.g. polyesters.

There is increasing interest in methods for the catalyzed conversion of epoxides and carbon dioxide to copolymers that are used as starting compounds for foams, adhesives, composite materials, fibers and fiber components, films, membranes or membrane components and resins. Methods of this type are described e.g. in DE19737547 A1. As the catalyst system here, a mixture of at least two dicarboxylic acids and an inorganic zinc compound is used.

WO2004/087788 A1 describes a method for polyol production, which encompasses the step of reacting an initiator with an alkylene oxide in the presence of a DMC catalyst and a sterically hindered chain transfer agent, wherein the chain transfer agent is capable of protonating the growing polyol polymer.

U.S. Pat. No. 5,026,676 describes a zinc carboxylate catalyst for the copolymerization of carbon dioxide with epoxides, which is produced by reacting zinc oxide with glutaric acid or adipic acid in an aprotic solvent.

EP0222453 A2 describes a method for producing polycarbonate, which encompasses the reaction of an epoxy compound with carbon dioxide and is carried out in the presence of a double metal cyanide complex. The double metal cyanide complex contains as possible ligands an alcohol, ester, aldehyde, ketone, ether, amide, nitrile, sulfide or a mixture thereof. Furthermore, the general formula of the double metal cyanide complex comprises a hydrocarbon.

EP0700949 A2 provides double metal cyanide catalysts (DMC catalysts), which encompass a DMC complex, an organic complexing agent and, based on the quantity of catalyst, 5-80 wt % of a polyether with a number average molecular weight of more than about 500.

CN1459332 A describes a DMC catalyst which, in addition to a double metal cyanide complex, encompasses a soluble metal salt, an organic complexing agent and an organopolysiloxane as well as, optionally, a polyether polyol.

There is a continuing need for catalysts that efficiently catalyze the polymerization of epoxides, thus making possible a cost-efficient method for producing epoxide-based polymers.

SUMMARY OF THE INVENTION

The object of the present invention is therefore to provide a catalyst system which makes effective reaction control possible with high Turn-over Frequencies (TOF) and/or Turn-over Numbers (TON) in the production of homo- and/or copolymers of epoxides and optionally other monomers.

The object is achieved according to the invention by a specially constructed catalyst. The present invention therefore provides a catalyst for catalyzing the polymerization of epoxides, obtainable by mixing
   a) at least one double metal cyanide compound,
   b) at least one organic complexing agent and
   c) at least one primary alcohol with 6 to 24 C atoms.

DETAILED DESCRIPTION OF THE INVENTION

The organic complexing agent and the primary alcohol with 6 to 24 C atoms are different compounds. The organic complexing agent is therefore preferably not a primary alcohol with 6 to 24 C atoms.

The term "polymerization of epoxides" within the meaning of the present invention encompasses both the homopolymerization and the copolymerization of epoxides, e.g. the copolymerization of different epoxides with one another and the copolymerization of one or more epoxides with carbon dioxide. A catalyst according to the invention displays excellent catalytic activity in the polymerization of epoxides and therefore makes possible an efficient and economical method for producing corresponding homo- and/or copolymers, for example of polyethers, polycarbonates or poly [ether] polycarbonates.

"Epoxides" are understood to be organic compounds that contain at least one epoxide group. Epoxides for reaction within the meaning of the present invention, i.e. using the catalyst according to the invention, are e.g. ethylene oxide, 1,2-propylene oxide, epichlorohydrin, 1,2-butylene oxide, 1,2-pentylene oxide, isopentylene oxide, 1,2-hexylene oxide, 1,2-heptylene oxide, methyl glycidyl ether, ethyl glycidyl ether, allyl glycidyl ether, phenyl glycidyl ether, butadiene monoxide, isoprene monoxide, tolyl glycidyl ether, cyclohexene oxide, cyclooctane epoxide, cyclododecane epoxide, (+)-cis-limonene oxide, (+)-cis,trans-limonene oxide and (−)-cis,trans-limonene oxide, with ethylene oxide, 1,2-propylene oxide, cyclohexene oxide, cyclooctane epoxide, cyclododecane epoxide, (+)-cis-limonene oxide, (+)-cis,trans-limonene oxide and (−)-cis,trans-limonene oxide being particularly preferred. In particular, 1,2-propylene oxide, which is generally also referred to simply as propylene oxide, is preferred.

The term "mixing" according to the invention encompasses bringing feedstocks into contact in such a way that these can undergo a chemical reaction with one another or enter into a physical interaction with one another, e.g. by forming a complex compound, which can also be referred to synonymously as a coordination compound.

A double metal cyanide compound is understood to be an inorganic compound that contains cyanide ions and a specific number of two different metal ions. These metal ions can differ in the metal itself or in its oxidation number. This means that either ions of two different metals are present or that they are ions of one and the same metal but are present in different oxidation states.

The double metal cyanide compound is preferably obtainable by mixing at least one salt of the general formula (1a)

$$M^1{}_{d'}X_{g'} \tag{1a},$$

where $M^1$ is a Zn, Fe, Co, Mn, Cu, Sn, Pb or Ni ion, X is an anion and d' and g' are integers >0 and assume values such that the salt $M^1_{d'}X_{g'}$ is electroneutral, with at least one complex of the general formula (1b)

$$M^4_{h'}[M^2(CN)_{e'}]_{f'} \qquad (1b),$$

where $M^4$ is an alkali metal ion, $M^2$ is a Co, Cr, Mn, Ir, Rh, Ru, V or Fe ion and h', e' and f' are integers >0 and assume values such that the complex $M^4_{h'}[M^2(CN)_{e'}]_{f'}$ is electroneutral.

$M^1$ is particularly preferably a Zn, Fe or Ni ion and most particularly preferably a Zn ion. $M^2$ is particularly preferably a Co or Fe ion and most particularly preferably a Co ion. $M^4$ is particularly preferably a K ion. X is particularly preferably a halide ion and most particularly preferably a chloride ion. In particular, the double metal cyanide compound is obtainable by mixing $ZnCl_2$ with $K_3(Co(CN)_6)_3$.

An organic complexing agent is understood to be an organic compound that has a functional group acting as an electron donor and is therefore capable of occupying a coordination site on a metallic central atom or central ion. Within the meaning of the present invention, compounds that are suitable as organic complexing agents preferably also exhibit a certain solubility in water. Preferred complexing agents according to the invention encompass alcohols, aldehydes, ketones, ethers, esters, amides, urea derivatives, nitriles, sulfides and mixtures of two or more of the above-mentioned compounds. Particularly preferably, the organic complexing agent is selected from ethanol, i-propyl alcohol, n-butyl alcohol, i-butyl alcohol, sec-butyl alcohol, tert-butyl alcohol, monoglyme, diglyme, 1,4-dioxane, furan and mixtures of two or more of the above-mentioned compounds. Most particularly preferably, the organic complexing agent is tert-butyl alcohol or monoglyme.

A primary alcohol is understood to be an alcohol, the OH group of which is present as a —$CH_2$—OH group. The primary alcohol with 6 to 24 C atoms can be either a saturated or an unsaturated alcohol. The term "unsaturated alcohol" encompasses alcohols having one or more double or triple bond(s), it being possible also for the alcohol to contain a combination of double and triple bonds. The primary alcohol preferably contains 8 to 22 C atoms, particularly preferably 8 to 20 C atoms. Most particularly preferably, the primary alcohol is selected from n-octanol, n-decanol, n-dodecanol, 2-octyldodecanol and undecen-1-ol.

The catalyst according to the invention preferably corresponds to the general formula (2)

$$M^1_d[M^2(CN)_e]_f*x\ M^3(X)_g*y\ H_2O*\ z\ L*a\ A \qquad (2),$$

where
$M^1$ is a Zn, Fe, Co, Ni, Mn, Cu, Sn or Pb ion,
$M^2$ is a Co, Fe, Cr, Mn, Ir, Rh, Ru or V ion,
$M^3$ is a Zn, Fe, Co, Ni, Mn, Cu, Sn, Pb, Cr, Ir, Rh, Ru or V ion, X is an anion, L is an organic complexing agent and A is a primary alcohol with 6 to 24 C atoms,
d, e, f and g are integers >0 and assume values such that the complex $M^1_d[M^2(CN)_e]_f*x\ M^3(X)_g$ is electroneutral, and
$0.1 \leq x \leq 5$; $0.1 \leq y \leq 1$; $0.1 \leq z \leq 1$ and $0.01 \leq a \leq 5$.

In the general formula (2), x, y, z and a are to be understood as representing the average molar proportion of the particular constituent, based on a (single) complex $M^1_d[M^2(CN)_e]_f$. The integers d, e, f and g, on the other hand, have a stoichiometric meaning, which is limited to the complex $M^1_d[M^2(CN)_e]_f*M^3(X)_g$ and represents a complete charge balance within this complex.

$M^1$ and $M^3$, independently of one another, are preferably a Zn, Fe or Ni ion, and $M^1$ is preferably equal to $M^3$. $M^2$ is preferably a Co or Fe ion. $M^1$ is particularly preferably a Zn ion and $M^2$ a Co ion. In particular, the complex $M^1_d[M^2(CN)_e]_f$ is preferably a zinc hexacyanocobaltate(III). X is preferably a halide ion, particularly preferably $Cl^-$. With regard to the organic complexing agent L and the primary alcohol A, the above statements apply in respect of preferred representatives. The primary alcohol A can also be present in the general formula (2) in deprotonated form, i.e. as an alcoholate. The alcoholate is regarded as being encompassed by the term "alcohol" in this respect.

The total proportion by weight of the organic complexing agent(s) and of the primary alcohol(s) in the catalyst according to the invention is preferably 15 to 50 wt % and more preferably 20 to 40 wt %, based on the total weight of the catalyst. The term "total proportion by weight" is understood to be the sum of the proportions by weight of the organic complexing agent(s) and of the primary alcohol(s).

The mixing of the components for producing the catalyst according to the invention preferably takes place in water.

The present invention also provides a method for producing the catalyst according to the invention, which encompasses mixing at least one salt of the general formula (1a)

$$M^1_{d'}X_{g'} \qquad (1a),$$

where $M^1$ is a Zn, Fe, Co, Mn, Cu, Sn, Pb or Ni ion, X is an anion and d' and g' are integers >0 and assume values such that the salt $M^1_{d'}X_{g'}$ is electroneutral, with at least one complex of the general formula (1b)

$$M^4_{h'}[M^2(CN)_{e'}]_{f'} \qquad (1b),$$

where $M^4$ is an alkali metal ion, $M^2$ is a Co, Cr, Mn, Ir, Rh, Ru, V or Fe ion and h', e' and f' are integers >0 and assume values such that the complex $M^4_{h'}[M^2(CN)_{e'}]_{f'}$ is electroneutral,
with at least one organic complexing agent L and at least one primary alcohol A with 6 to 24 C atoms in an aqueous dispersion,
separating off the resulting solid phase,
bringing the solid phase into contact at least once with an aqueous dispersion of L and A and
isolating the reaction product obtained.

For the organic complexing agent L and the primary alcohol A as well as for $M^1$, $M^2$ and $M^4$, the meanings and preferences stated above apply here.

Preferably, after the solid phase is separated from the aqueous dispersion, it is brought into contact at least twice, more preferably at least three times, with an aqueous dispersion of L and A. "Bringing into contact" here means that the feedstocks are brought together in a manner that allows a chemical reaction or a physical interaction to take place.

The present invention also provides a method for the polymerization of epoxide, wherein at least one epoxide is polymerized in the presence of at least one catalyst according to the invention. The term "polymerization" here encompasses both the homopolymerization and the copolymerization of epoxide(s). The method according to the invention is preferably a method for the copolymerization of at least one epoxide and carbon dioxide ($CO_2$). In this case, the polymerization takes place in the presence of carbon dioxide, which can be added to the reaction mixture in principle in solid, liquid or gaseous form. It is preferably metered in as a liquid or gas. A method of this type can be used, e.g. for the production of polycarbonate.

The molar ratio of substrate:catalyst within the framework of the present invention is preferably from 100:1 to 10,000,000:1 and more preferably from 1,000:1 to 5,000,000:1.

The method according to the invention is preferably carried out at temperatures of 0 to 300° C., more preferably 25 to 200° C., particularly preferably 50 to 160° C. and in particular 60 to 140° C.

The method according to the invention is preferably carried out in the presence of at least one solvent. In this case, the solvent is preferably present at least in a quantity such that the epoxide or epoxides to be polymerized is/are dispersed therein. The solvent is preferably a polar, OH-group-free compound. Suitable solvents are e.g. halogen-containing solvents, such as dichloromethane, trichloromethane, carbon tetrachloride, 1,1-dichloroethane, 1,2-dichloroethane; mono- and polyhalogenated alkanes and alkenes; aromatics, such as toluene; xylene or the mono- or polyhalogenated derivatives thereof, such as bromotoluene, chlorotoluene, dichlorotoluene, chlorobenzene; ethers, such as diethyl ether, dipropyl ether, cyclic ethers, such as tetrahydrofuran and dioxane; nitriles, such as e.g. acetonitrile and acrylonitrile; ketones, such as e.g. acetone and butanone, mono- and diaryl ketones; cycloalkanes and cycloalkenes; esters, such as ethyl acetate, and mixtures of two or more of the above-mentioned solvents. The solvent is preferably selected from nitriles, esters and halogenated hydrocarbons, in particular from dichloromethane, trichloromethane, bromotoluene, chlorotoluene, dichlorotoluene, chlorobenzene, acetonitrile, acrylonitrile and ethyl acetate. The solvent is particularly preferably selected from dichloromethane, trichloromethane, acetonitrile and ethyl acetate, and the solvent is most particularly preferably dichloromethane. The water content of the solvent(s) used is preferably less than 0.05 vol. %, based on the total volume of the solvent(s) used.

The present application also provides the use of a catalyst according to the invention for the polymerization of at least one epoxide. The term "polymerization" here encompasses both homopolymerization and copolymerization. Preferred according to the invention is the use of a catalyst according to the invention for the copolymerization of at least one epoxide with carbon dioxide.

In the present invention, all of the features mentioned within the framework of the present text, in particular the embodiments, ranges of proportions, components and other features of the composition according to the invention and of the uses according to the invention that are indicated as preferred and/or special, can be implemented in all possible combinations that are not mutually exclusive, wherein combinations of features that are indicated as preferred and/or special are also regarded as preferred and/or special.

EXAMPLES

Production of Catalysts According to the Invention

Example 1

Use of Eutanol G=2-octyldodecan-1-ol

A solution of 6.25 g zinc chloride in 10 ml distilled water is added with vigorous stirring (20,000 rpm) to a solution of 2 g potassium hexacyanocobaltate and 1 g Aerosil 380 in 35 ml distilled water. A mixture of 25 g t-butanol in 25 ml distilled water is added to the dispersion and stirred vigorously for 10 min (20,000 rpm). A mixture of 0.5 g Eutanol G and 0.5 g t-butanol in 50 ml distilled water is added and stirred for 3 min at 1000 rpm.

The resulting solid is isolated and stirred with a mixture of 35 g t-butanol and 0.5 g Eutanol G in 15 ml distilled water for 10 min (10,000 rpm). Filtration is then carried out and the filter cake is stirred with a mixture of 50 g t-butanol and 0.25 g Eutanol G for 10 min (10,000 rpm). Filtration is carried out again, and the residue is concentrated in a rotary evaporator under reduced pressure.

A powdery white solid is obtained.

Example 2

Use of 1-dodecanol

A solution of 6.25 g zinc chloride in 10 ml distilled water is added with vigorous stirring (20,000 rpm) to a solution of 2 g potassium hexacyanocobaltate in 35 ml distilled water. A mixture of 25 g t-butanol in 25 ml distilled water is added to the suspension. The mixture is then stirred vigorously for 10 min (20,000 rpm). A mixture of 0.05 g 1-dodecanol and 0.50 g t-butanol in 50 ml distilled water is then added and stirred for 3 min at 1000 rpm.

A solid is isolated by filtration and stirred with a mixture of 35 g t-butanol and 0.05 g 1-dodecanol in 15 ml distilled water for 10 min (10,000 rpm).

After a further filtration, the solid is stirred with a mixture of 50 g t-butanol and 0.025 g 1-dodecanol for 10 min (10,000 rpm).

After a further filtration, the residue is dried at 50° C. under ambient pressure.

A powdery white solid is obtained.

Example 3

Use of 10-undecen-1-ol

A solution of 1 g potassium hexacyanocobaltate in 18 ml distilled water is added to a solution of 3 g zinc chloride in 5 ml distilled water with vigorous stirring (20,000 rpm) at a temperature of 60° C. A solution of 0.93 g potassium hydroxide in 10 ml distilled water is added and stirred for 5 min.

A mixture of 16 ml t-butanol in 12.5 ml distilled water is added to the suspension. After 10 min of vigorous stirring (20,000 rpm) at 60° C., a mixture of 0.4 ml t-butanol and 0.022 g 10-undecen-1-ol in 25 ml distilled water is added and stirred for 3 min at 1000 rpm.

The solid is isolated by filtration and stirred with a mixture of 22.5 ml t-butanol and 0.022 g 10-undecen-1-ol in 7.5 ml distilled water for 10 min at 60° C. (10,000 rpm). Filtration is then carried out and the residue that is obtained is stirred with a mixture of 32 ml t-butanol and 0.011 g 10-undecen-1-ol at 60° C. for 10 min (10,000 rpm). The solid is isolated and dried at 50° C. under normal pressure. Yield: 1.36 g (powdery white solid).

Example 4

Use of Eutanol G=2-octyldodecan-1-ol

A solution of 3 g zinc chloride in 30 ml distilled water is added with vigorous stirring (7,000 rpm) to a solution of 0.5 g potassium hexacyanocobaltate and 0.1 g Eutanol G in 20 ml distilled water. Immediately after completion of the addition, a solution of 13 g t-butanol in 13 ml distilled water is added to the dispersion and stirred vigorously for 10 min (7,000 rpm). The resulting solid is isolated and stirred with a mixture of 1 g t-butanol and 0.05 g Eutanol G in 25 ml distilled water for 20 min (7,000 rpm). The solid is then separated off again and stirred with a mixture of 20 g t-butanol and 0.05 g Eutanol G in 10 ml distilled water for 20 min (7,000 rpm). The solid is separated off again and stirred with a mixture 0.05 g Eutanol G in 25 g t-butanol for 20 min (7,000 rpm). Filtration is carried out again and the residue is concentrated in a rotary evaporator under reduced pressure.

A powdery, white solid is obtained.

Homopolymerization of Propylene Oxide

Example 5

1-liter Autoclave 24 g of tripropylene glycol (192.3 g/mol) are weighed into a 1-liter stirred autoclave, this is purged three times and stirred and heated for one hour in vacuo (<0.1 mbar) at 70° C. After cooling, 0.1 g of the DMC catalyst from Example 2 (200 ppm) are added, the autoclave is purged three times, 20 g propylene oxide (PO) are metered in and heated to 120° C. with stirring. At 120° C., the polymerization begins with a marked increase in temperature and accelerated pressure drop. The remaining quantity of PO (456 g) is metered in at a temperature of 110-125° C. After all the PO has been consumed, stirring is continued for one hour at 120° C. Yield: 500 g polyether polyol.

Example 6

100 ml Autoclave 27 g of heated Desmophen 2061BD (polypropylene glycol with a molecular weight of approx. 2000 g/mol, obtainable from Bayer MaterialScience AG) and 15 mg DMC catalyst from Example 3 were added to the 100-ml autoclave, and this was purged three times and heated to 110° C. with stirring (1000 rpm). At 110° C., 7.2 ml PO were metered in. The pressure rose to 3.5 bar. After an induction period of 30 minutes, an accelerated pressure drop and a rapid temperature increase to 150° C. were observed. Yield: 34 g polyether polyol.

Example 7

100-ml Autoclave 27 g of heated Desmophen 2061BD (polypropylene glycol with a molecular weight of approx. 2000 g/mol, obtainable from Bayer MaterialScience AG) and 15 mg DMC catalyst from Example 4 were added to the 100-ml autoclave, this was purged three times and heated to 110° C. with stirring (1000 rpm). At 110° C., 7.2 ml PO were metered in. The pressure rose to 3.5 bar. After an induction period of 7 minutes, an accelerated pressure drop and a rapid temperature increase to 170° C. were observed. Yield: 34 g polyether polyol.

The invention claimed is:

1. A catalyst for catalyzing the polymerization of epoxides comprising a reaction product of or a complex compound of:
   a) a double metal cyanide compound;
   b) an organic complexing agent selected from the group consisting of ethanol, i-propyl alcohol, n-butyl alcohol, i-butyl alcohol, sec-butyl alcohol, tert-butyl alcohol, monoglyme, diglyme, 1,4-dioxane, furan and mixtures thereof; and
   c) a primary alcohol with 20 to 24 C atoms.

2. The catalyst according to claim 1, wherein the double metal cyanide compound is a chemical reaction product of a salt having the formula (1a)

$$M^1_{d'}X_{g'} \qquad (1a),$$

where $M^1$ is a Zn, Fe, Co, Mn, Cu, Sn, Pb or Ni ion, X is an anion and d' and g' are integers >0 and assume values such that the salt $M^1_{d'}X_{g'}$ is electroneutral, with at least one complex of the formula (1b)

$$M^4_{h'}[M^2(CN)_{e'}]_{f'} \qquad (1b),$$

where $M^4$ is an alkali metal ion, $M^2$ is a Co, Cr, Mn, Ir, Rh, Ru, V or Fe ion and h', e' and f' are integers >0 and assume values such that the complex $M^4_{h'}[M^2(CN)_{e'}]_{f'}$ is electroneutral.

3. The catalyst according to claim 1, wherein the catalyst has a structure of formula (2)

$$M^1_d[M^2(CN)_e]_f * x\, M^3(X)_g * y\, H_2O * z\, L * a\, A \qquad (2),$$

where $M^1$ is a Zn, Fe, Co, Ni, Mn, Cu, Sn or Pb ion,
$M^2$ is a Co, Fe, Cr, Mn, Ir, Rh, Ru or V ion,
$M^3$ is a Zn, Fe, Co, Ni, Mn, Cu, Sn, Pb, Cr, Ir, Rh, Ru or V ion,
X is an anion, L is the organic complexing agent and A is the primary alcohol with 20 to 24 C atoms,
d, e, f and g are integers >0 and assume values such that the complex $M^1_d[M^2(CN)_e]_f * x\, M^3(X)_g$ is electroneutral, and
$0.1 \leq x \leq 5$; $0.1 \leq y \leq 1$; $0.1 \leq z \leq 1$ and $0.01 \leq a \leq 5$.

4. The catalyst according to claim 1, wherein the total proportion by weight of organic complexing agent and primary alcohol is 15 to 50 wt %, based on the total weight of the catalyst.

5. A method for polymerizing epoxides, which comprises bringing together at least one epoxide and the catalyst according to claim 1.

6. The method according to claim 5, wherein the method is carried out in the presence of at least one solvent.

7. The method according to claim 5, wherein the method is carried out as a method for the copolymerization of at least one epoxide and carbon dioxide.

* * * * *